Figure 1:
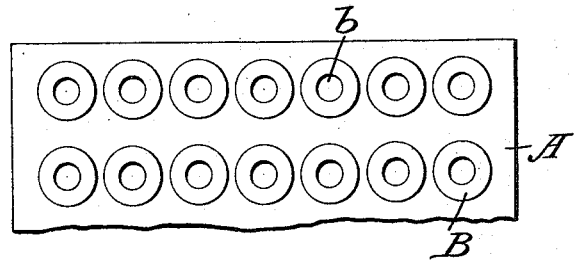

E. W. COFFIN.
METHOD OF MAKING SCREW NUTS, SCREW CAPS, AND SIMILAR ARTICLES.
APPLICATION FILED NOV. 23, 1914.

1,127,186.

Patented Feb. 2, 1915.
2 SHEETS—SHEET 1.

Witnesses:
A. R. Appleman
M. E. Rodriguez

Inventor,
EDWARD WARREN COFFIN.
By his Attorneys.
Edwin Bernhard

THE NORRIS PETERS CO., PHOTO-LITHO., WASHINGTON, D. C.

E. W. COFFIN.
METHOD OF MAKING SCREW NUTS, SCREW CAPS, AND SIMILAR ARTICLES.
APPLICATION FILED NOV. 23, 1914.
1,127,186.
Patented Feb. 2, 1915.
2 SHEETS—SHEET 2.
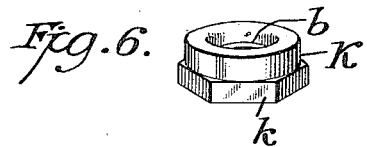
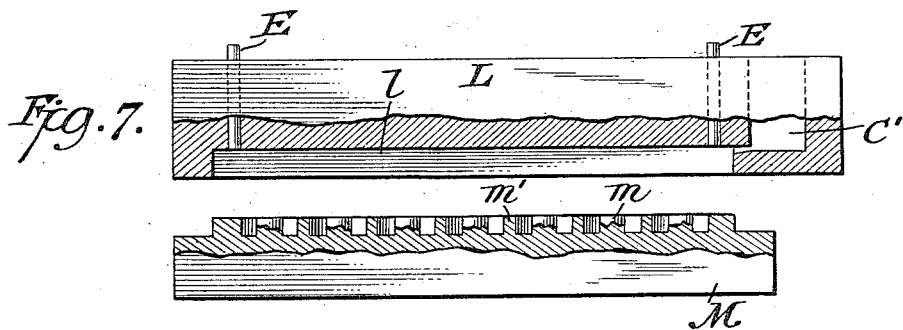
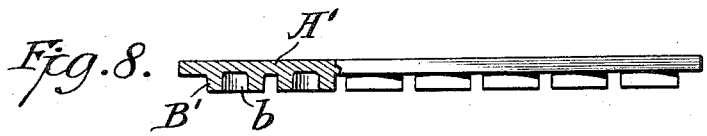
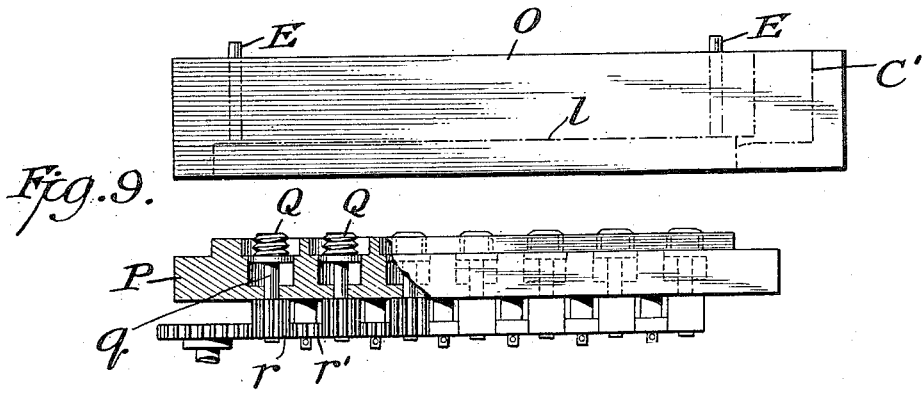
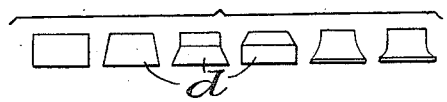
Witnesses:
A. R. Appleman
M. C. Rodriguez
Inventor,
EDWARD WARREN COFFIN.
By his Attorneys
Edson & Bernhard

UNITED STATES PATENT OFFICE.

EDWARD WARREN COFFIN, OF EAST ORANGE, NEW JERSEY.

METHOD OF MAKING SCREW-NUTS, SCREW-CAPS, AND SIMILAR ARTICLES.

1,127,186.   Specification of Letters Patent.   Patented Feb. 2, 1915.

Application filed November 23, 1914. Serial No. 873,459.

*To all whom it may concern:*

Be it known that I, EDWARD WARREN COFFIN, a citizen of the United States, residing at East Orange, county of Essex, and State of New Jersey, have invented a certain new and useful Method of Making Screw-Nuts, Screw-Caps, and Similar Articles, of which the following is a specification.

This invention is a method of making screw nuts, screw caps and analogous articles, the object being to produce articles which are accurate as to form and dimensions and to expedite and simplify the manufacture whereby substantial economy is obtained.

The product in the form of screw nuts is useful, mainly, on the binding posts of electrical batteries, whereas the screw caps are intended for use as closures for the collapsible tubes now so extensively used in packaging tooth-pastes, shaving soaps, various kinds of drugs, and medicinal preparations; but it will be understood that I do not limit the invention to the making of the particular articles specified, for the reason that other small metal articles are capable of being produced by the process of my invention.

It is now customary to make screw nuts from bar or tube stock on automatic screw machines, and it has been proposed to cut nut blanks in or from a metal bar, the same to be thereafter shaped, bore and tapped by screw machine operations, and, further, in making screw caps the caps are cast individually and tapped.

According to my invention whereby economy of manufacture is secured, I first cast a plate with a number of integral projecting members by or according to the die casting operation, and subsequently cut said plate in the space between the members projecting therefrom. In making screw nuts or screw caps, the plate is cast with a number of hollow studs by forcing metal under pressure into the die of suitable conformation, whereby great accuracy even to the smallest detail, such as ornamentation desirable in screw caps, is obtained. The studs on the plate may, if desired, be formed with female threads simultaneously with, or at the time of, casting said studs with the plate, but according to my preferred mode of procedure the hollow studs are formed at the casting operation with smooth non-threaded interior walls. After casting the plate, the studs being integral therewith, said plate is ejected from the die, and is transferred to a multiple tapping machine, for the purpose of producing at one operation the female threads on the interior of all said hollow studs, and finally the plate is cut on lines between the studs, preferably by a gang of cutters in a suitable machine, so as to produce at one operation a number of the articles, each interiorly threaded and complete in all details, except that it may be, and preferably is, desirable to place such articles in a tumbling machine of one form or another for eliminating rough edges from the same.

From the foregoing, it is apparent that my invention, when used in the manufacture of screw nuts and screw caps, and according to the preferred mode of procedure, involves a series of successive steps performed in a definite order; first, casting a plate with studs, second, tapping the studs, and, third, cutting the plate on lines between the studs, the cutting being performed at one operation, thus resulting in a number of articles each complete in itself. The procedure specified is generic to both forms of the invention employed for the manufacture of screw nuts and screw caps, but the details or specific steps followed in the manufacture of screw nuts differ somewhat from the details employed in the production of screw caps. Thus in the nut making operation, the plate is cast for the studs to project from one side thereof, the holes in the studs extend through the plate, the holes, preferably, are tapped for only a part of the length thereof, and in cutting the plate a square, polygonal or other shoulder is produced on the nuts at one end thereof, the desired shoulder being cut from the metal of the plate. The die casting step of the process enables me to accurately cast the articles according to form and dimensions without subsequent finishing, except, of course, the tapping and cutting steps necessarily involved, and, further, I am enabled to use soft metal, or any alloy of metals, of a nature and quality suitable for the articles to be produced, as a result of which a substantial saving in time and labor is secured and material economy in the manufacture is attained.

Other features and advantages of the invention will appear in the course of the following detailed description.

Figure 2:
Figure 3:
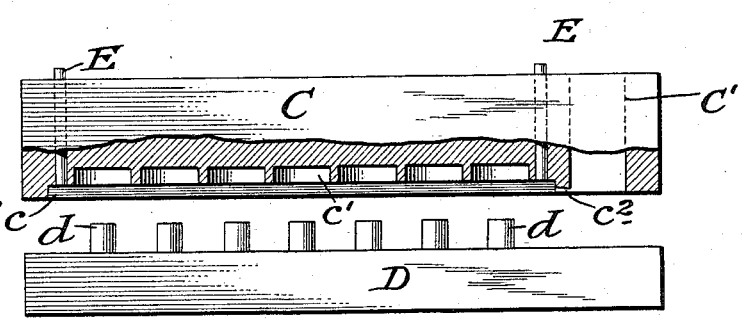
Figure 4:
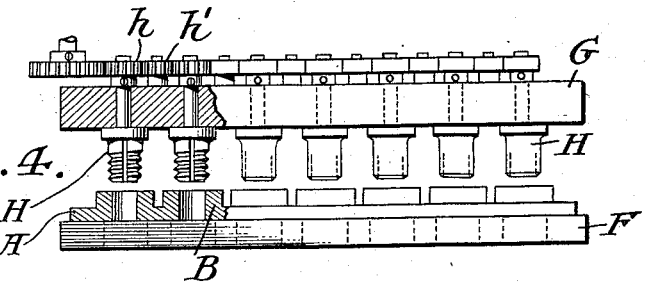
Figure 5:
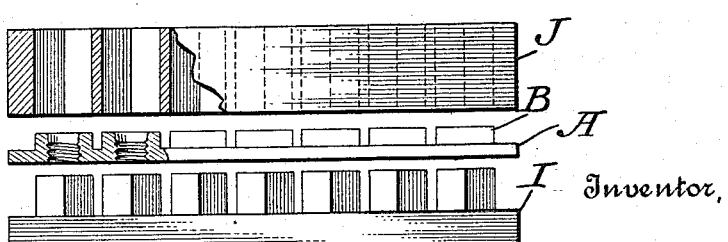

In the drawings, Figures 1 and 2 show in plan and edge elevation, respectively, a metal plate provided with studs and suitable for the manufacture of screw nuts in accordance with my invention. Fig. 3 is an elevation with the upper die member partly in vertical section of a die suitable for casting the plate illustrated in Figs. 1 and 2. Fig. 4 is an elevation partly in vertical section of mechanism suitable for simultaneously tapping the studs of the metal plate so as to produce interior screw threads thereon. Fig. 5 illustrates one form of punch press mechanism whereby the plate is adapted to be cut on lines intermediate the studs. Fig. 6 is a perspective view on an enlarged scale of one of a number of screw nuts or screw caps produced in accordance with my invention. Fig. 7 is an elevation partly in vertical section of a form of the die for casting a plate with studs adapted to produce screw caps. Fig. 8 is an edge elevation partly in vertical section of the cast plate having studs integral therewith and suitable for the manufacture of screw caps according to this invention. Fig. 9 is an elevation partly in vertical section of a modified form of the casting die whereby the screw threads may be formed interiorly of the studs during the operation of casting the plate having studs integral therewith. Fig. 10 illustrates various forms of core pins which may be provided on one member of the die suitable for casting a plate from which screw nuts or screw caps are to be produced.

I will now proceed to describe the procedure and means employed in the manufacture of screw nuts according to this invention, reference being had to Figs. 1 to 5, inclusive of the drawings. I first cast a plate A with a number of studs B, the latter being integral with the plate. Obviously, the plate may be of any desired form, thickness and dimensions. The studs B are provided with openings $b$, which openings extend through the plate; said studs are shown as arranged in rows lengthwise and crosswise of the plate, but said studs may be staggered, or arranged in any desired order. It is apparent that the plate may be provided with any desired number of hollow studs. The plate and the studs are composed, preferably, of soft metal or of an alloy of metal, but it will be understood that any suitable material may be used in the manufacture of the threaded articles. The studded plate is cast in a die according to the well known die casting procedure, whereby accuracy in form and dimensions of the articles will result. A die suitable for the purpose is shown in Fig. 3, the same consisting of an upper member C, a lower member D and suitable ejecting means, the same being shown as pins E. The upper member C of the die is provided with a longitudinal shallow recess $c$ and with cavities $c'$, the latter being in communication with the recess $c$. The shallow recess $c$ determines the form and dimensions of the plate A, whereas the cavities $c'$ determine the form and dimensions of the studs B which project from said plate. The lower die is provided with core pins $d$, corresponding in number and arrangement to the cavities $c'$ of the upper die member, but the cross sectional area of each core pin $d$ is less than the cross sectional area of the corresponding cavity $c'$, whereby the metal flowing into the recess $c$ and cavities $c'$ will fill the recess and the cavities so as to surround the core pins $d$, thus resulting in the formation of the plate A within the recess $c$ and the production of hollow studs B within the cavities $c'$ and around the core pins. As shown, the die is provided with a gate $C'$ in the upper member C, said gate communicating by a passage $c^2$ with the recess $c$ in said die member C, said gate and passage providing for the flow of molten metal under pressure into the die. The step of producing the studded plate by the die C D is apparent. The parts C D of the die are assembled and locked, and the metal is supplied through the gate $C'$ and passage $c^2$ so as to flow into the upper die member C and around the core pins $d$, said inflowing metal filling the recess $c$ and the cavities $c'$ and resulting in the plate A with the hollow studs B. The die is opened, and the plate is ejected therefrom by the operation of the pins E. The form of the core pins $d$ employed on the lower die member D may be varied according to the form and dimensions of the studs which it is desired to produce on the plate A. Fig. 10 of the drawings shows various forms of the core pins adapted to be employed on the lower die member D. The first core pin of the series shown will result in casting a hollow stud, the opening of which is bounded by a cylindrical wall, said opening being of uniform diameter, but either of the other pins will result in giving to the hollow stud an opening of a different shape, so that it does not become necessary to tap or screw thread the opening for only a part of the length of said opening. After casting the studded plate in the die and ejecting said plate from the die, the next step in the procedure is to tap the studs, suitable means for accomplishing which tapping operation is illustrated in Fig. 4. The plate is positioned upon a suitable bed F below a head G which carries a gang of taps H, the spindles of said taps being provided with gears $h$ in mesh with idlers $h'$ so as to rotate all the taps in one direction simultaneously. By a relative movement between the parts F G the taps are positioned to enter the openings $b$ in the hollow studs of the plate A, whereby the studs and the plate are provided with interior screw threads. Subsequent to the tapping operation the plate is transferred to a punch press, the coöperating members of which are indicated at I J. The punches of this press cut the plate A on lines intermediate the hollow tapped studs B, and in the manufacture of screw nuts the lines of cut in the plate are exterior to the outer surfaces of the studs, as a result of which the article K shown in Fig. 6 is provided with an external shoulder $k$, the metal to form said shoulder being cut from the metal of the plate A. The shoulder $k$ is shown in Fig. 6 as polygonal in form, but it is apparent that this shoulder may be square, octagonal or of any other desired configuration. By cutting the plate in the manner described very little scrap or waste metal results, but it is apparent that the scrap may be melted and thus utilized. Furthermore, the cutting of the plate produces a large number of individual or detached nuts, each nut being accurate as to both form and dimensions, and complete without requiring a subsequent finishing operation. It is preferred, however, to place a quantity of the nuts in a tumbling machine of one form or another for the purpose of removing rough edges, if any are left on the articles as a result of the cutting operation.

The procedure and means employed for the manufacture of screw caps differs in details from the process and means for manufacturing the screw nuts as heretofore described. In Fig. 7 of the drawings there is shown a die suitable for producing a plate, represented in Fig. 8, from which the screw caps are made. The die consists of an upper member L and a lower member M, said upper member being provided with a recess $l$, the ejector pins E and the gate C'. The lower die member M is raised on the upper portion thereof, and in it is cut circular grooves $m'$ so as to produce core pins $m$ within said grooves, the upper ends of said core pins $m$ being flush or substantially so with the upper face of the raised part of the die M. Said raised part of die M enters the cavity $l$ of die L to a predetermined extent so as to produce a mold space in die L, the depth of the mold space and the thickness of resulting plate A' being determined by the depth of the space between the upper face of the raised portion of die M and the top face or wall of the recess $l$ in die L, whereas the circular grooves $m'$ in die M open into the mold space formed by the described opposing faces of dies L M, so that the molten metal admitted by gate C' will fill the mold space to form the plate A' and fill, also, the circular grooves $m'$ around the core pins of die M to produce the hollow studs B' integral with the plate. The openings in said hollow studs B' do not extend through plate A' for the reason that the core pins $m$ are flush with the top face of the raised part in die M, hence these core pins $m$ do not extend into the mold space of die L when said dies L M are assembled for use. It will be understood that the lower die and the upper die are assembled and locked together by means usual in the art, and that the molten metal under pressure is admitted by the gate to the upper die so as to flow into the mold space $l$ and around the core pins $m$, whereby the plate A' and the hollow studs B' are accurately cast in the die, after which the plate is ejected or removed from the die. The die may be and preferably is provided with means for casting a desired ornamentation in or on the plate. The plate and the hollow studs are integral, and as the openings in the studs B' extend only part way through said studs, it follows that said plate A' closes the openings in said studs at one side thereof, see Fig. 8. After casting the plate it is tapped by mechanism such as shown in Fig. 4, and thereafter it is cut on lines between the studs as by the punch press mechanism of Fig. 5. This results in individual or separate caps each of which is closed at one end and the stud of which is interiorly threaded. If desired, the plate of Fig. 8 may be cut on lines parallel to the outer surface of the studs B' or to milling cast on said studs, but it is apparent that the lines of cut may be exterior to the outer surfaces of the studs, as a result of which the screw nuts are provided with polygonal shoulders similar to the shoulders $k$ of the article K shown in Fig. 6.

As heretofore shown and described the plate of Figs. 1 and 2, or the plate of Fig. 8, is first cast and then the screw threads are provided within the studs by a separate operation, but I do not desire to be limited to the separate operations of casting the plate and thereafter tapping the same, for the reason that in the die casting method it is possible to cast the threads in the hollow studs simultaneously with the casting of the plate, for which purpose mechanism such as shown in Fig. 9 may be employed. The upper die O may be constructed as in Fig. 3 or in Fig. 7, but the lower die member P is provided with a series of removable core pins Q, the latter having male threads. These core pins are provided with shanks $q$ to which are fixed gears $r$, the latter being in mesh with idlers $r'$ whereby all the core pins Q are adapted for rotation in one direction. The members O P of the die are assembled and locked, and the molten metal is forced under pressure into the die O so as to flow around the threaded core pins Q, whereby the hollow studs are provided with internal threads at the casting operation. The core pins are released from the studs of the cast metal plate, after the die is opened, by imparting rotative movement to the gears $r r'$, whereby the core pins are rotated so as to withdraw them from the hollow studs.

From the foregoing description taken in connection with the drawings it is apparent that my invention involves, broadly, the operation of casting a plate with integral projections, such as the hollow studs shown, according to the die casting method, said hollow studs of the plate being preferably provided with threads either during the casting operation, as by the means shown in Fig. 9, or by a subsequent operation of the gang of taps performed on the plate after removing the same from the die, and thereafter the plate is cut so as to produce the individual articles, either the screw nuts, the screw caps, or analogous articles. These operations result in articles which are accurate both as to form and dimensions, and which, if desired, may be ornamented during the course of their production, one of the chief advantages secured being the rapidity and economy of manufacture owing to the simultaneous production of a number of articles from a single cast plate.

Having thus fully described the invention, what I claim as new, and desire to secure by Letters Patent is:

1. In the art of making metal articles, such as screw nuts, screw caps or the like, the process which consists in casting a plate with a number of studs, providing said studs with threads, and subsequently cutting the plate on lines between the studs so as to produce at the cutting operation a number of detached articles accurate as to both form and dimensions.

2. In the art of making screw nuts, screw caps and analogous articles, the process which consists in casting a plate with a number of hollow studs, providing said hollow studs interiorly thereof with screw threads, and cutting the plate on lines between the studs.

3. In the art of making screw nuts, screw caps and analogous articles, the process which consists in introducing molten metal under pressure in a die for casting a plate with hollow studs integral therewith, removing the studded plate from said die, tapping the hollow studs to produce screw threads interiorly thereof, and cutting the plate on lines between the studs.

4. In the art of making screw nuts, screw caps and the like, the process which consists in introducing molten metal under pressure in a die and casting a flat plate with a series of hollow studs integral therewith, providing said hollow studs with interior screw threads, and cutting the plate on lines between the studs to produce a number of individual articles.

5. In the art of making screw nuts, screw caps and the like, the process which consists in introducing molten metal under pressure in a die and casting a flat plate with a series of hollow studs integral therewith, removing the studded plate from the die, tapping said hollow studs simultaneously to produce interior screw threads therein, and punching the plate at one operation on lines between the studs so as to cut the tapped studs therefrom.

6. In the art of making screw nuts and analogous articles, the process which consists in introducing molten metal under pressure into a die and casting a plate with hollow studs integral with said plate, providing said hollow studs with interior screw threads, and cutting the plate on lines exterior to the studs so as to produce shoulders on the individual studs, the metal to form which shoulders is cut from the metal of the plate.

7. In the art of making screw nuts and analogous articles, the process which consists in introducing molten metal under pressure into a die and casting a plate with hollow studs integral with said plate, the openings in said studs extending through the plate, removing the studded plate from the die, tapping the hollow studs so as to produce screw threads therein, and cutting the plate between the studs so as to result in individual or detached threaded articles.

8. In the art of making screw nuts and analogous articles, the process which consists in introducing molten metal under pressure into a die and casting a plate with hollow studs integral therewith, removing said plate from the die, simultaneously tapping said studs to produce screw threads therein, and thereafter cutting the plate on lines exterior to the studs and producing at such cutting operation a number of individual studs each provided with a projecting shoulder the metal of which is cut from the metal of the plate.

In testimony whereof I have signed my name to this specification in the presence of two subscribing witnesses.

EDWARD WARREN COFFIN.

Witnesses:
H. I. BERNHARD,
M. C. RODRIGUEZ.

Copies of this patent may be obtained for five cents each, by addressing the "Commissioner of Patents, Washington, D. C."